United States Patent [19]
La Borde

[11] 4,008,380
[45] Feb. 15, 1977

[54] TELEPHONE CONVERSION UNIT WITH MULTIPLE MEMORY SYSTEM
[75] Inventor: Richard C. La Borde, Hibbing, Minn.
[73] Assignee: Rood Tool Co., St. Paul, Minn.
[22] Filed: June 30, 1975
[21] Appl. No.: 592,056
[52] U.S. Cl. .......................... 179/90 B; 179/16 AA
[51] Int. Cl.[2] .......................................... H04M 1/44
[58] Field of Search ........ 179/90 B, 90 BB, 90 BD, 179/90 K, 90 R, 2 DP

[56] References Cited
UNITED STATES PATENTS

| | | | |
|---|---|---|---|
| 3,536,853 | 10/1970 | Tate | 179/90 B |
| 3,601,552 | 8/1971 | Barnaby et al | 179/90 B |
| 3,860,765 | 1/1975 | McCabe et al. | 179/90 B |
| 3,885,108 | 5/1975 | Zock | 179/90 B |

FOREIGN PATENTS OR APPLICATIONS

1,238,258  7/1971  United Kingdom .............. 179/90 B

Primary Examiner—Thomas A. Robinson
Attorney, Agent, or Firm—Cushman, Darby & Cushman

[57] ABSTRACT

A telephone conversion unit for substitution in a standard rotary dial telephone is disclosed wherein a keyboard coded telephone number is converted to a serial pulse train which simulates that generated by a standard telephone rotary dialer unit. The converter includes a keyboard switch having at least 10 keys for generating signals corresponding to each key depressed. An electrical encoder converts the signals into a four bit parallel signal with each encoded signal uniquely identifying a depressed one of the 10 keys of the keyboard. A dialer circuit means converts the encoded signal to a serial pulse train corresponding to the respective keys depressed. Power for the conversion unit is provided by converting the telephone line current coupled to the telephone unit when the hook switch is closed to a voltage suitable for powering the converter unit. A memory means is provided wherein when a memory control key of the keyboard switching means is depressed, the number keyed is stored in a location of the memory selected by the subsequent depression of one of the keys of the keyboard. The number can be retrieved from memory and coupled to the dialer means by momentarily depressing the memory control key and the key which addresses location in memory in which the number to be dialed is located. Mechanically the conversion unit together with the memory means can be positioned in a standard dial telephone unit by substitution of the conversion means in place of the dialer.

6 Claims, 7 Drawing Figures

TELEPHONE CONVERSION UNIT WITH MULTIPLE MEMORY SYSTEM

BACKGROUND OF THE INVENTION

This invention relates to a telephone conversion unit and to a telephone conversion unit with a multiple memory system therein.

Systems for converting a push button input to a series of pulses suitable for simulating a telephone dial are known in the art as exemplified by the General Instrument Corporation Ay-5-9100 push button telephone dialer circuit. This push button dialer circuit receives a parallel 4-bit input together with a strobe input which is generated each time a key is depressed and in response thereto provides at its output a series of pulses suitable for simulating a telephone dial.

Further, a number of patents such as U.S. Pat. Nos. 3,860,765, 3,555,201, 3,665,113, 3,670,111, and 3,735,050 disclose repertory dialers which apply telephone dialing signals to a telephone line in response to the selection of a switch corresponding to the desired telephone number. Each of these references disclose random access memories which require separate switching keyboards for selecting the particular location of the stored number in memory and for generating the signals to be stored within selected locations of the memory. Such duplication of keyboards increases the cost and complexity as well as the size of the telephone instruments. The McCabe et al U.S. Pat. No. 3,860,765 patent does disclose a single keyboard unit for controlling the storage of numbers in memory or the direct dialing of numbers via an output pulsing unit. There are, however, several drawbacks of this telephone number generator. Thus, a separate power supply is required for driving the generator, and no means are disclosed for simply inserting a conversion unit into a dial telephone in place of the dialer unit thereof. Further, this generator does not disclose an alternative to the complex mechanical keyboard switches commonly utilized in telephones. These keyboard switches are designed so that at least two mechanical switches are closed upon the depression of a single key. This results in a relatively low long-term reliability for the keyboard unit and relatively high assembly costs.

It accordingly is an object of this invention to provide an improved telephone conversion unit for converting a standard dial telephone to a keyboard controlled telephone.

It is another object of this invention to provide a telephone conversion unit with a multiple memory system for memorizing a plurality of telephone numbers which subsequently can be retrieved from memory and utilized to generate a series of pulses suitable for simulating a telephone dial.

SHORT STATEMENT OF THE INVENTION

Accordingly, this invention relates to a telephone conversion unit for converting a keyboard coded telephone number to a serial pulse train corresponding to that generated by a telephone dialer unit wherein the converter includes a keyboard switching means having at least 10 keys for generating signals corresponding to each of the keys depressed. The signals generated by the keys are encoded by an electrical encoder which converts these signals into a parallel 4-bit signal which uniquely identifies each of the 10 keys. The output of the encoder together with a strobe pulse which is generated whenever a key is depressed is coupled to a dialer circuit which converts the encoded signal to a serial pulse train which corresponds to the respective keys depressed. Power is supplied to the convertor by a power supply generator which receives a portion of the current coupled to the telephone unit when the hook switch of the telephone is closed and in response generates a supply voltage having a desired magnitude for driving the conversion unit.

This invention also relates to a telephone conversion and multiple memory system wherein a keyboard coded telephone number is converted to a serial pulse train which corresponds to that generated by a telephone dialer unit. The keyboard switching means has at least 10 code keys for generating signals corresponding to the keys depressed, and at least one other memory control key for enabling a memory unit. The output of the keyboard switching means is encoded electronically to uniquely identify each one of the 10 code keys as the keys are depressed. When the memory enable key is depressed followed by the depression of a code key to select a memory location in a memory unit, the telephone number subsequently keyed is stored in memory for later retrieval. When the memory enable key is not depressed, the number keyed on the keyboard is directly coupled via the encoder to the dialer circuit for converting the encoded signal to a serial pulse train corresponding to the respective keys depressed. When a selected number in storage is to be retrieved for coupling same to the dialer circuit means, the memory enable key is momentarily depressed followed by the depression of the key identifying the memory location of the number. The number is then transferred to the dialer circuit which converts the stored signal to a serial pulse train.

Mechanically, the conversion unit together with the multiple memory system of the present invention is mounted in a housing structure which can be substituted directly in place of the dialer unit of a standard rotary dial telephone unit. Since power is derived from the telephone lines connected to the telephone unit, no external power source is required thereby reducing the size of the telephone unit and the number of wires connected thereto.

BRIEF DESCRIPTION OF THE DRAWINGS

Other objects, features and advantages of the present invention will become more fully apparent from the following detailed description of the preferred embodiment, the appended claims, and the accompanying drawings in which.

DETAILED DESCRIPTION OF THE PREFERRED EMBODIMENT

Figure 1:
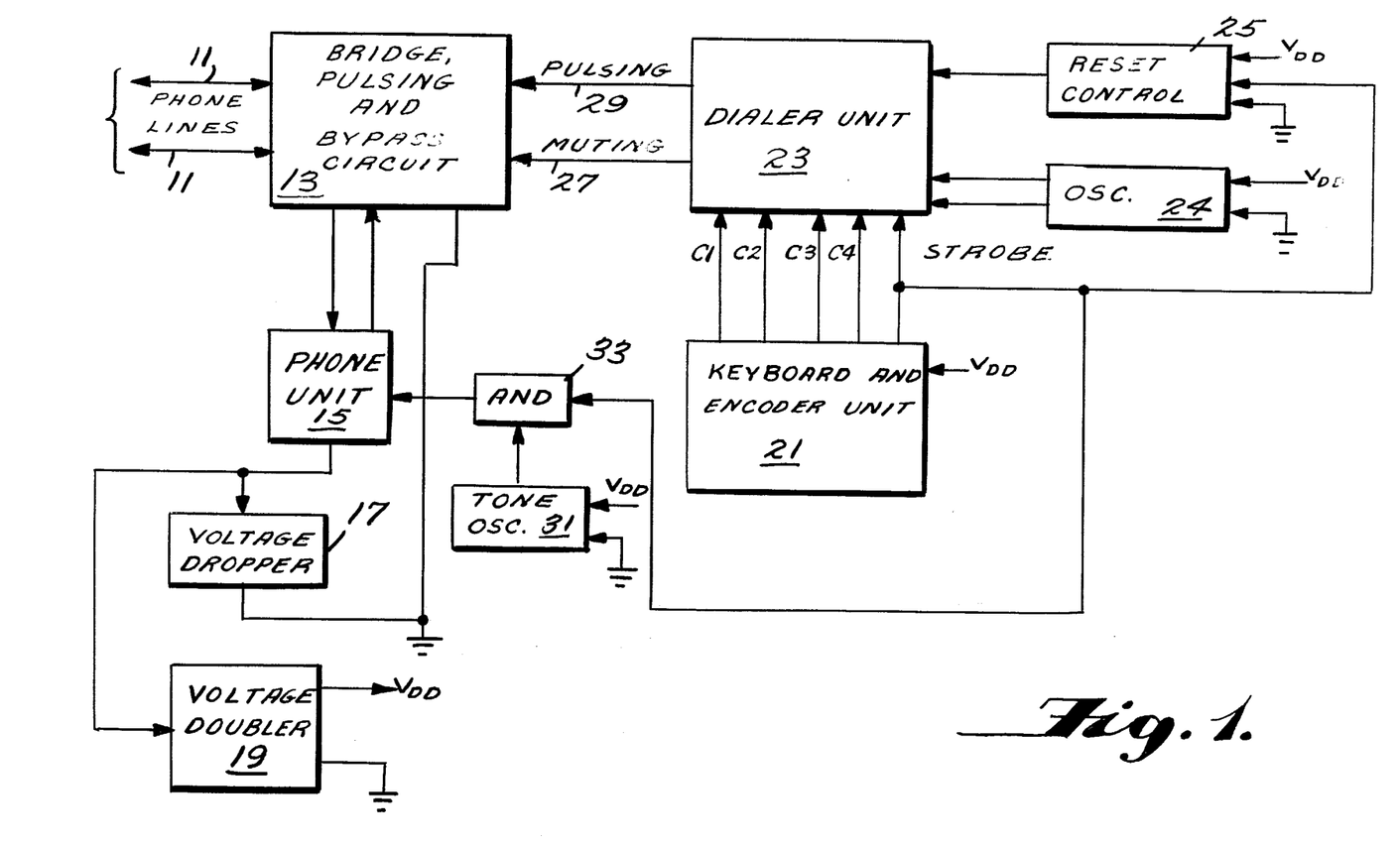
FIG. 1 is a schematic block diagram of the preferred embodiment of the telephone conversion unit of the present invention.

Refer now to FIG. 1 which is a schematic illustration of the preferred embodiment of the telephone converter of the present invention. Telephone lines 11 which form a part of the telephone system are connected to a standard telephone unit 15 via a bridge, pulsing and bypass circuit 13 which rectifies the bipolar current conducted by the phone lines 11. The rectified current is conducted to the phone unit 15 via a muting switch in the bridge, pulsing and bypass circuit 13. The rectified current is conducted through the phone unit 15 and through a voltage dropper 17 of conventional design, which in the preferred embodiment, is a Zener diode. A voltage doubler circuit 19 which will be explained more fully with regard to FIG. 2 adjusts the voltage across the voltage dropper 17 so that a required supply voltage $V_{DD}$ is provided. Thus, whenever the handset receiver of the telephone is removed from the lift hook or cradle thereof, telephone line current on lines 11 is rectified and conducted through the phone unit 15 with a portion thereof converted to a voltage of desired magnitude for driving the conversion unit of the present invention.

A keyboard and encoder unit 21 is provided wherein the keyboard has at least 10 keys corresponding to the numerals 0–9, respectively. The keyboard includes only one mechanical switch for each key in order to simplify the mechanical structure of the keyboard and to increase the long-term reliability thereof. Accordingly, an encoder is provided in the keyboard and encoder unit 21 in order to electrically encode the at least 10 possible outputs of the keyboard into a parallel, 4-bit encoded signal which is coupled to a dialer unit 23 on lines C1-C4. Also coupled to the dialer unit 23 is a strobe pulse for activating the dialer unit 23 whenever a key is depressed on the keyboard unit. The dialer may be of any conventional design known in the art; however, in the preferred embodiment the dialer unit is a General Instruments Corporation AY-5-9100 push button telephone dialer circuit. The dialer circuit must be set to receive the coded input thereto on lines C1-C4, and accordingly the strobe pulse generated by the keyboard is coupled to a reset control circuit 25, the output of which removes the reset on the dialer so that the dialer can receive the encoded signals and in response thereto generate both a muting and a pulsing signal. Thus the output of the dialer on line 27 blocks current flow through the phone unit 15 when a pulsed output appears on line 29. The pulsing output on line 29 turns on and off a switch connected across the bridge rectifier in order to provide a pulse output which simulates the series of pulses generated by a standard telephone dial. The dial is clocked by means of a pair of phase displaced clock signals generated by oscillator 24.

Because the keyboard switching unit 21 is used in lieu of a standard rotary dial, a tone oscillator 31 is provided which generates an audio frequency tone signal. This signal is gated by AND gate 33 upon the generation of a strobe pulse by the keyboard unit 21 and is coupled to the phone 15. The tone signal is coupled to the speaker of the telephone handset to provide an audio indication of the occurrence of a switching action in the keyboard unit 21.

Figure 2:
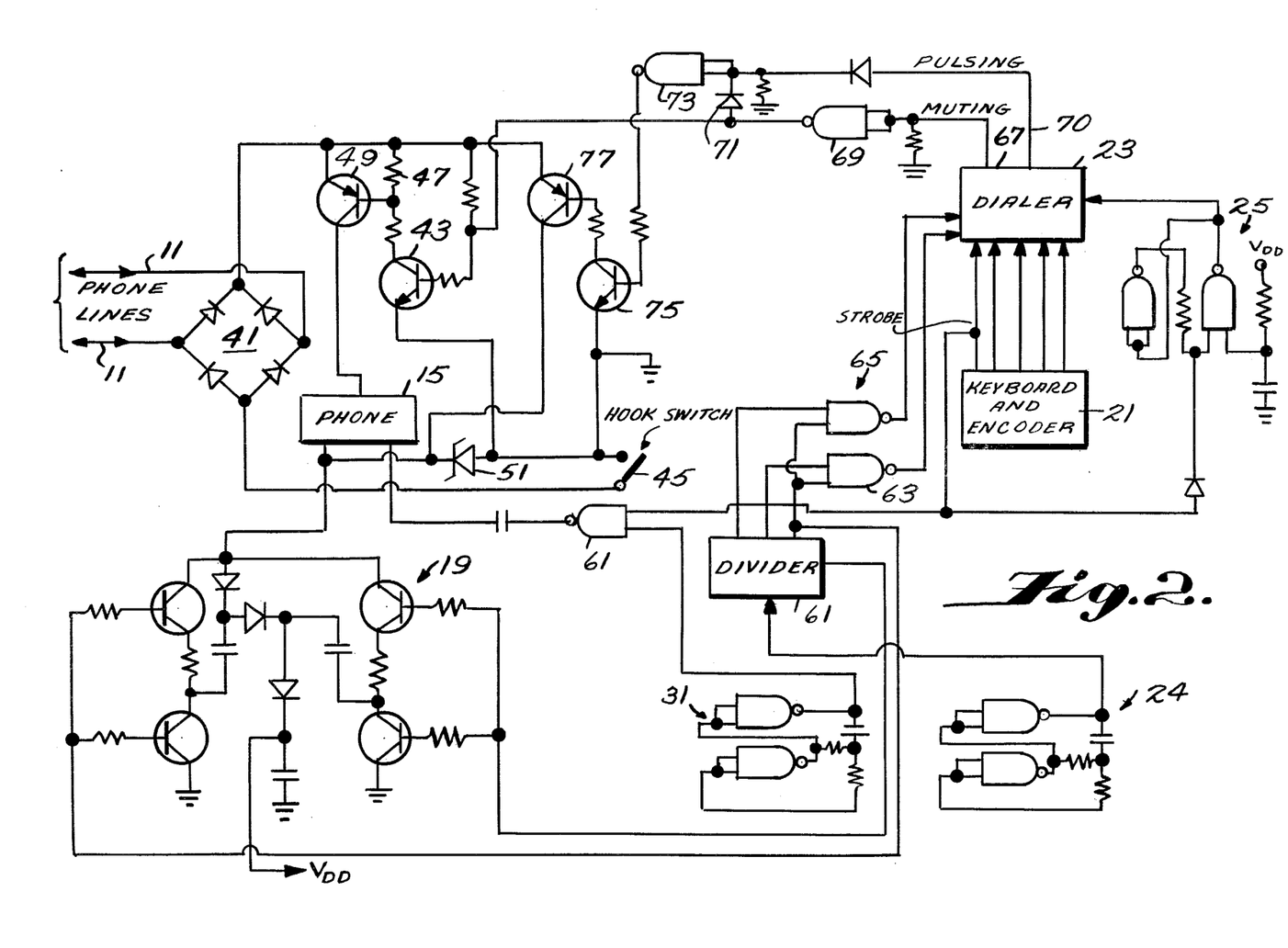
FIG. 2 is a more detailed schematic illustration of the preferred embodiment of the telephone conversion unit illustrated in FIG. 1.

Refer now to FIG. 2 which is a more detailed schematic illustration of the preferred embodiment of the converter circuit of the present invention. Telephone line current is coupled to the converter circuit of the present invention via phone lines 11 and is full wave rectified by a bridge rectifier 41. The output of bridge rectifier 41 is connected to the base of transistor 43. When the handset receiver of the telephone is removed from the telephone unit thereby closing hook lever switch 45, the rectified current is conducted from one output terminal of the rectifier through transistor 43, through switch 45 and back to the other terminal of the bridge rectifier 41. When this occurs the voltage drop across resistor 47 causes transistor 49 to turn on, thereby coupling rectified current from the line 11 through the conventional phone unit 15, Zener diode 51 which serves as a voltage dropper, through hook lever switch 45 and back to the bridge rectifier 41.

Figure 3:
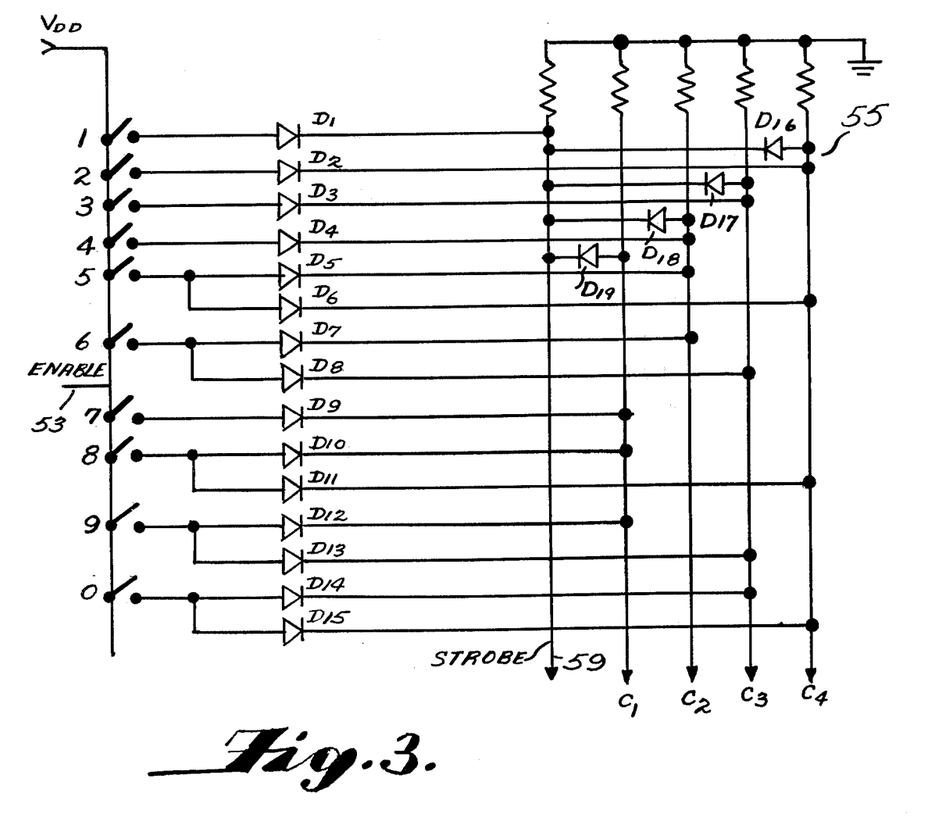
FIG. 3 is a schematic illustration of a preferred embodiment of the electronic encoder of the present invention.

When this occurs the keyboard and encoder unit 21 is ready for keying a selected telephone number. As aforementioned, the keyboard includes at least 10 numerical keys, 0–9, wherein when each key is depressed, an associated mechanical switch is closed. Refer now very briefly to FIG. 3 which is a schematic illustration of the keyboard switch and electronic encoder of the present invention. Switches 0–9 correspond to the mechanical switches associated with each of the keys of the keyboard unit 21. A supply voltage $V_{DD}$ which is derived from the telephone line current in manner to be described more fully hereinbelow is coupled to one side of each of the switches. An encoder circuit is provided which is generally designated by the numeral 55. The encoder converts each of the signals generated by the closure of a corresponding keyboard switch into a parallel, 4-bit encoded signal which is coupled to the dialer unit 23 of the present invention. In addition, a strobe pulse is generated whenever any of the switches is closed. The strobe pulse as aforementioned sets the dialer unit 23 and enables an electrical tone signal to be coupled to the microphone of the telephone handset.

As an example, assume that the switch designated by the numeral 6 is closed. The voltage $V_{DD}$ is thus connected across diodes D7 and D8 thereby causing a high voltage, i.e., $V_{DD}$, to be coupled on output lines C2 and C3, to the dialer and at the same time via either diode D17 or D18 the voltage $V_{DD}$ is coupled to the strobe output line 59.

As will be explained more fully in connection with the multiple memory system illustration in FIGS. 4 and 5, an enable line 53 is connected to the keyboard to inhibit the generation of an encoded output when the system is in the retrieval mode. The advantage to having such an electronic encoding means is that only one mechanical switch need be associated with each key on the keyboard unit and as each key is depressed the mechanical switch is operated only once. Accordingly, this substantially simplifies and prolongs the lifetime of the keyboard switching means of the present invention over conventional keyboard units such as utilized in the touch tone telephone units commercially available.

Refer now back to FIG. 2 wherein there is disclosed an oscillator circuit 31 of conventional design for generating a tone signal. When a key on the keyboard unit 21 is depressed, a strobe pulse is coupled to NAND gate 61 which thereby enables the tone signal from oscillator 31 to be coupled to the microphone of the handset receiver of the phone unit 15. At the same time the strobe pulse output of the keyboard 21 is coupled to the reset control 25 which is in the form of a conventional flip-flop. The output of reset control 25 sets the dialer circuit 23 so that the dialer will be set for receiving the encoded number.

An oscillator circuit 24 of conventional design provides an output to divider circuit 61. The divider circuit 61 provides a first output which is coupled to NAND gates 63 and 65. A second output of the divider is coupled to the NAND gate 63 and a third output thereof is coupled to NAND gate 65 so that at the outputs of the NAND gates clocking pulses are provided which are phase displaced from one another. These clocking pulses are coupled to the dialer circuit 23 for controlling the internal timing of the dialer circuit and powering the dialer circuit.

At output terminal 67 of the dialer circuit there is provided a muting pulse whenever a signal has been coupled to the dialer circuit for transmission over the telephone lines. The muting signal goes high when a serial pulse train is to be generated and is inverted by NAND gate 69. The output of NAND gate 69 is coupled to the base of transistor 43 to thereby turn transistor 43 off. With transistor 43 turned off, the base of transistor 49 goes high thereby turning off transistor 49 and thus preventing current from passing through the phone unit 15 during the time in which pulses corresponding to the number dialed are transmitted over lines 11. When a muting pulse is not provided on output line 67, the output of NAND gate 69 goes high. This signal is coupled to NAND gate 73 via diode 71. NAND gate 73 inverts the high signal with the output thereof coupled to the base of transistor 75, thereby turning off transistor 75. With transistor 75 turned off, transistor 77 is turned off thereby preventing the flow of current from the bridge rectifier 41 through Zener diode 51, hook switch 45 and back to the bridge rectifier 41. Thus, when no muting signal appears on output line 67, the only path for current to flow is through the phone unit 15. However, upon the occurrence of a muting signal, the current flow through the phone unit 15 is blocked by transistor 49.

A predetermined time after the muting signal is generated, a pulse train is provided on output line 70 which is coupled to NAND gate 73. The form of the pulse train depends upon the number keyed in the keyboard. The pulse train after being inverted by NAND gate 73 is coupled to transistor 75 which is alternately turned on and off by the inverted pulse train. This in turn causes transistor 77 to be alternately turned on and off thereby generating a pulsed current in the output lines 11 which corresponds to the key depressed on the keyboard 21.

In order to provide power for driving the keyboard and encoder unit 21 and the dialer circuit 23 as well as the oscillator circuits and NAND gates without requiring an external power supply, a Zener diode 51 is positioned in series with the phone unit 15 and the hook lever switch 45. The voltage drop across the Zener diode, which must be small enough so that the normal operation of the phone unit 15 is not adversely affected, provides an input to a voltage doubling or adjusting circuit generally designated by the numeral 19. The voltage adjusting circuit operates in the manner of a conventional voltage doubler circuit and provides an output $V_{DD}$ which in the preferred embodiment has a magnitude of 15 volts. The $V_{DD}$ output, however, is provided only when the hook switch 45 is closed and current is conducted through the Zener diode. At all other times there is no input voltage to the voltage adjusting circuit 19 and accordingly the keyboard unit 21 and the dialer circuit 23 are both inoperative during this time.

Figure 4:
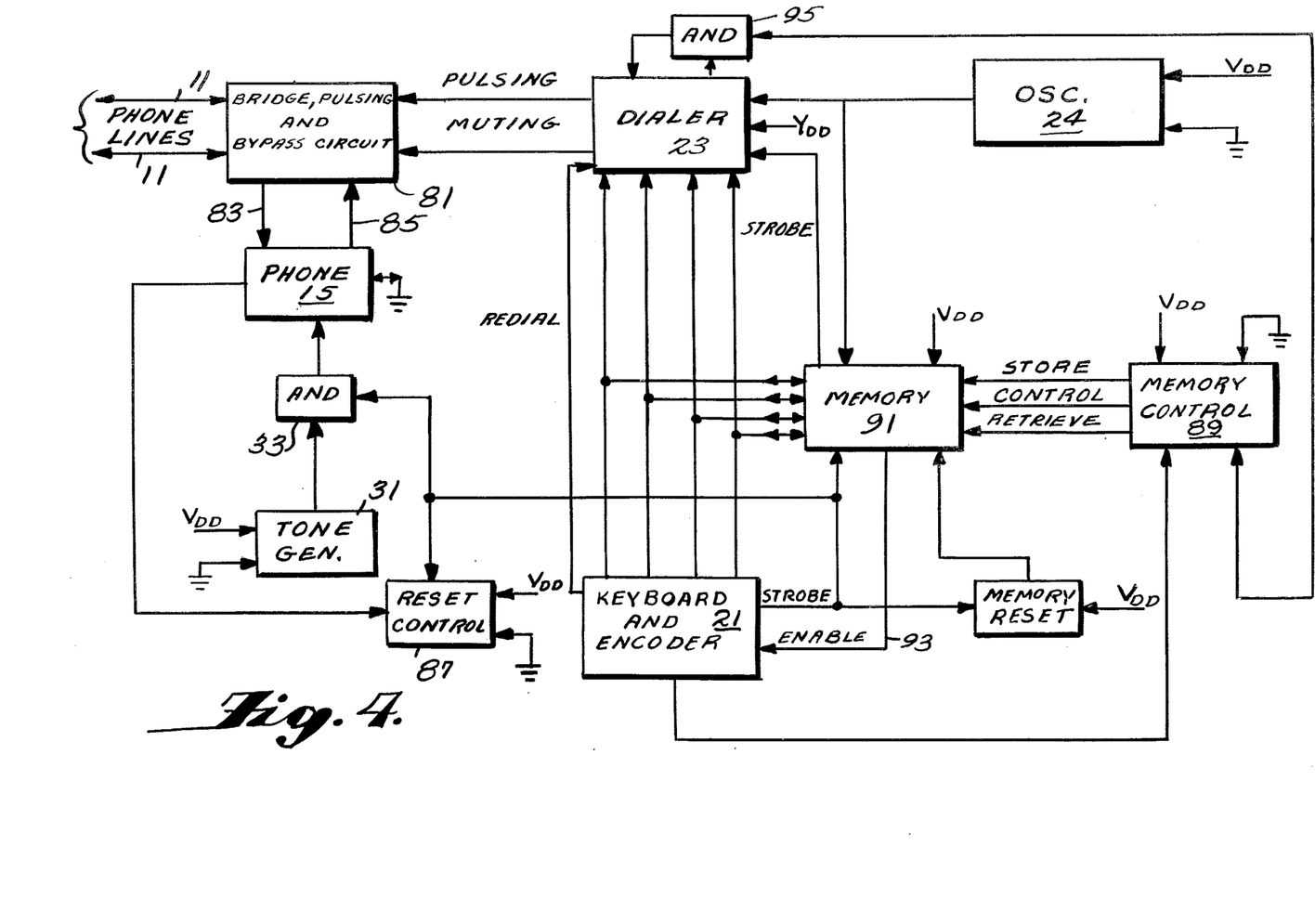
FIG. 4 is a schematic block diagram of the telephone conversion unit with multiple memory system of the present invention.

Refer now to FIG. 4 which is a schematic diagram of the preferred embodiment of the telephone conversion unit with a multiple memory system formed as a part thereof. Telephone lines 11 are connected to a bridge, pulsing and bypass circuit 81 wherein the current conducted by the phone lines 11 is full wave rectified and coupled to a standard phone unit 15. The current is conducted from one terminal of the bridge rectifier along line 83 and then back to the other terminal of the bridge rectifier along line 85 only when the switch hook of the phone unit 15 closes a circuit path across the output terminals of the bridge rectifier through the phone unit 15. When this occurs an output pulse is generated which is coupled to a reset control circuit 87. The reset control circuit provides an output for resetting a memory control circuit 89 and for resetting the dialer circuit 23 which is aforementioned preferably is a General Instruments AY-5-9100, push button telephone dialer circuit. The memory control together with a memory storage unit 91 which in the preferred embodiment is a dynamic random access storage circuit such as the General Instruments Corporation AY-5-9200 repertory dialer, stores ten 22-digit telephone numbers. Of course, more than one memory unit may be utilized in order to enlarge the storage capacity of the memory if desired.

A keyboard and encoder 21 is provided which is of the same design as that disclosed in the first embodiment of the present invention. The keyboard and encoder circuit 21 is coupled to both the memory unit 91 and the dialer unit 23. The keyboard unit has a number (No.) key which when depressed generates a signal which is coupled to the memory control circuit 89. In response thereto the memory control circuit 89 generates a control and store command input to the memory unit 91 which in turn inhibits the passage of the strobe pulses through the memory to the dialer. Thus during the time in which a telephone number is being stored, strobe pulses generated by the keyboard and encoder unit 21 are inhibited from being coupled to the dialer. Accordingly, the output of the keyboard and encoder unit is stored in a selected location of memory rather than being coupled to the dialer for conversion to a serial pulse train corresponding to the key depressed. Numbers are stored in memory by initially depressing the numbers key (No.) so that the memory unit is conditioned for receiving information to be stored. Next, one of the 10 numerical keys is depressed to identify the storage address of the number to be stored. Next, the telephone number to be stored is sequentially keyed into the memory unit at the end of which the memory control unit 89 can be reset to its original state by placing the receiver on the phone unit 15 to thereby open the hook switch therein.

For retrieving a telephone number from memory so that the number can be coupled to the dialer unit 23, the hook switch must be closed to thereby clear the memory control 89 and reset the dialer unit 23. The numbers key (No.) is then depressed and released in order to cause the memory control circuit 89 to generate a control and a retrieve signal which are coupled to the memory unit 91. Next, the storage location in which the desired number is stored is accessed by depressing the key which identifies the storage location. At this point the keyboard and encoder 21 is disabled by a signal which appears on line 93 and the contents of the address storage location are read out of memory and written into the dialer unit 23. When in the retrieval state the memory circuit 91 generates a strobe pulse so that the dialer 23 and the memory are in synchronization with one another. At the end of the reading process, the retrieval state is terminated by replacing the receiver handset onto the telephone unit to thereby open the hook switch and clear the memory control 89.

A re-dial function is provided in situations where during the dialing of a number or immediately thereafter it is not desired to complete the telephone connection. The asterisk key (*) is depressed before the handset is returned to the phone unit. This prevents the resetting of the dialer since the output of the asterisk key (*) is coupled to the dialer unit which in turn generates an inhibit pulse to AND gate 95 which prevents a reset signal from being coupled to the dialer when the handset is returned to the telephone unit. Then upon lifting of the handset from the telephone to thereby close the hook switch, the number in the dialer is converted to a serial pulse train corresponding to the number coupled to the dialer after the asterisk key (*) is again depressed.

A tone generator or oscillator 31 is provided which generates a tone signal which is coupled to the telephone unit 15 via AND gate 33. AND gate 33 is enabled whenever a key is being depressed and accordingly the person dialing a number via the keyboard obtains confirmation that the mechanical switch associated with the keyboard has been actuated by listening for the tone signal from the tone generator 31.

A second oscillator 24 is provided which generates two pulse trains displaced from one another in time which pulse trains are coupled to both the dialer unit 23 and the memory unit 91, so that both the dialer and memory are in synchronism with one another.

As was the case with the embodiment of FIG. 1 the dialer provides a muting pulse at one output thereof for cutting off current flow through the phone unit 15. A short time after the muting pulse is generated and before the muting pulse is terminated a series of pulses are generated by the dialer which are coupled to the telephone lines 11 by the bridge, pulsing and bypass circuit 81.

Figure 5:
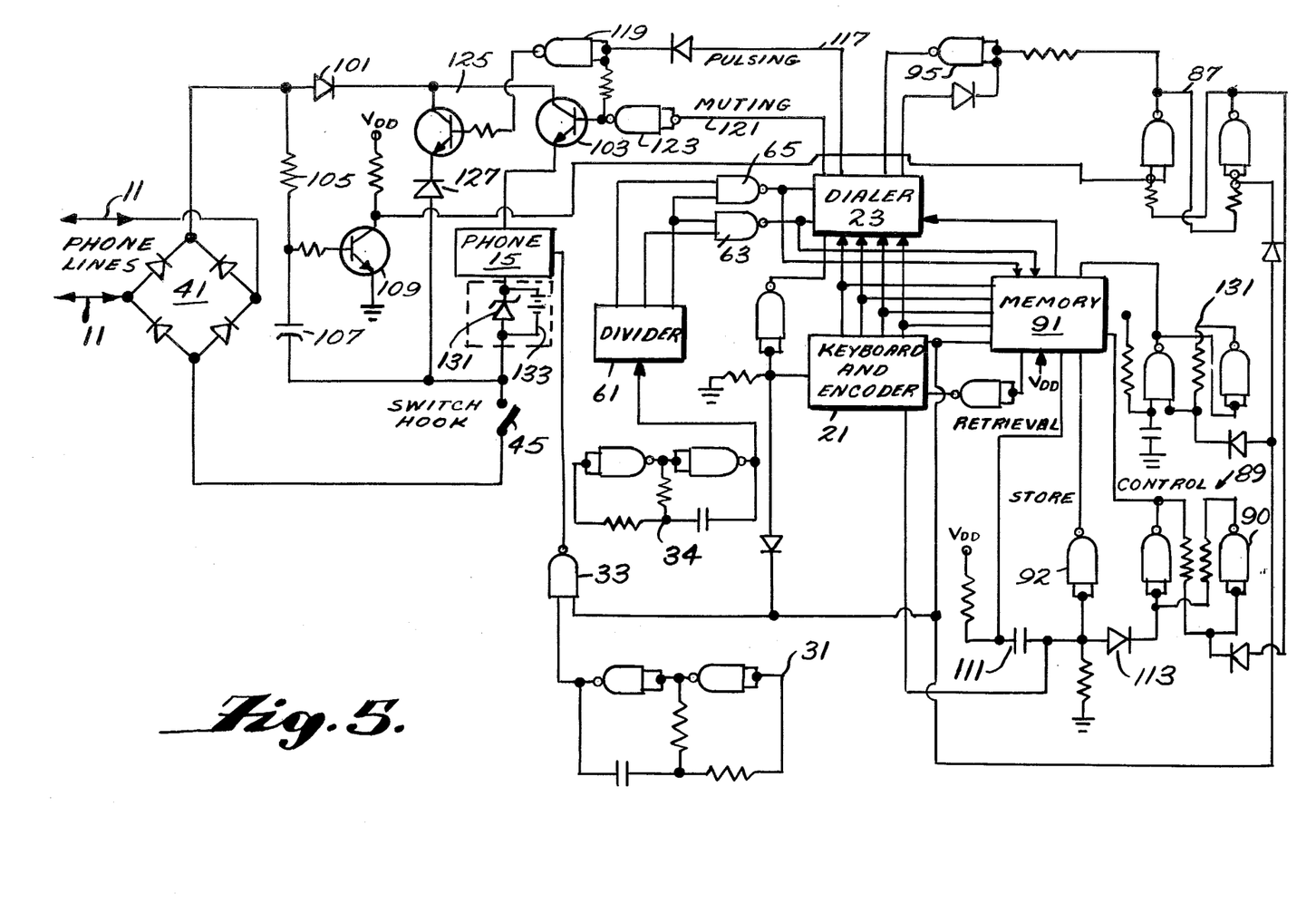
FIG. 5 is a more detailed schematic diagram of the preferred embodiment of the telephone conversion unit with multiple memory of the present invention.

Refer now to FIG. 5 which is a more detailed illustration of the preferred embodiment of the telephone conversion unit with multiple memory system of the present invention. Telephone line current on telephone lines 11 is full wave rectified by bridge rectifier 41 and coupled to a telephone unit 15 via diode 101, muting transistor 103 and hook lever switch 45. When the hook lever switch 45 is closed an RC circuit including resistor 105 and capacitor 107 is connected across the bridge so that the current flowing therethrough charges the capacitor 107 unitl transistor 109 is turned on. With transistor 109 turned on, the output of the transistor 109 is connected to the input of the reset control circuit 87 which is a flip-flop of conventional design known in the art. In response to transistor 109 being turned on, the reset control circuit 87 generates a pulse which is coupled to NAND gate 95. NAND gate 95 inverts the pulse thereby removing the reset from the dialer unit 23. At the same time a low going pulse is coupled to the memory control circuit 89 which includes therein a flip-flop of conventional design 90. This low going signal is coupled via the flip-flop 90 to the memory unit 91 to thereby set the memory unit in condition for the storage and retrieval of telephone numbers with respect thereto.

With the reset removed from dialer 23 and the memory unit 91 in condition for storing signals, the system is set for operation. In order to store a number the numbers key (No.) of the keyboard unit 21 is depressed thereby coupling a pulse to storage NAND gate 92 which is a part of the memory control circuit 89. Accordingly, at the output of NAND gate 92 there is a low going pulse which when held low inhibits strobe pulses from the keyboard unit 21 from passing thru the memory unit 91 to the dialer 23, and enables the storage of a telephone number in memory 91. As aforementioned the next key to be depressed addresses the memory location in which the telephone number will be stored. Subsequently the telephone number is entered into memory by appropriately depressing selected ones of the keys on the keyboard unit 21. After the number has been read into memory the storage state of the memory unit 91 can be removed by releasing the numbers key (No.).

Telephone numbers stored in the memory unit 91 can be retrieved and coupled to the dialer 23 by depressing and then releasing the numbers key. Thus a pulse is coupled to one side of capacitor 111 to thereby discharge the capacitor 111. When the pulse is removed by releasing the numbers key (No.) the retrieval input to the memory unit 91 goes low to thereby set the memory in a retrieval state. At the same time a pulse is coupled via diode 113 to the flip-flop 90, which provides in response thereto a low input signal to the memory to thereby enable the memory 91. The memory unit 91 then internally generates strobe pulses which are coupled to the dialer 23. At the same time in sync with the strobe pulses, pulses corresponding to the numbers stored in the storage location selected are coupled to the dialer circuit.

If a number is being dialed and a busy signal is received or if the dialer otherwise does not wish to talk to the party called, the asterisk key (*) is depressed before returning the handset to the phone unit 15. When this occurs a signal is coupled to the dialer 23 for setting a flip-flop therein which in turn provides an inhibit signal to the NAND gate 95. This signal prevents the dialer from being reset when the hook switch 45 is opened when the handset receiver is repositioned on the phone. At the same time the output of the keyboard unit due to the depression of the asterisk key is coupled to the NAND gate 33 to thereby enable a tone signal from oscillator 31 to be coupled to the telephone unit 15 to indicate to the operator that a key has been depressed.

Subsequently, when the handset is again removed from the telephone and the hook switch 45 closed, if the asterisk key is depressed the flip-flop within the dialer unit 23 is switched to its other state to thereby permit the dialed number to be converted to a pulse train dependent upon the number dialed. The pulse train is coupled on output line 117 to NAND gate 119. A short period of time before the pulse train is generated a muting signal is provided on output line 121 and coupled to an inverter 123. The inverter provides an output signal which turns off transistor 103 thereby preventing current flow from the telephone lines 11 through the telephone unit 15. The pulse train is then coupled to the inverting NAND gate 119 with the output thereof being coupled to transistor 125. In response transistor 125 is alternately turned on and off to provide current pulses to the output line 11. Since the telephone unit 15 is being bypassed in the generation of output pulses, a Zener diode 127 is provided which simulates the voltage drop across the telephone unit 15.

If for some reason power should be disconnected from the memory converter and then is turned on, the memory is placed in the reset condition by a memory reset control 131. This clears the memory for receiving information to be stored. Subsequently, upon depression of the numbers key (No.), a positive going pulse is coupled to the flip-flop which constitutes the reset control 131 to place the memory in the set condition for receiving information to be stored.

It should be understood that in keeping with the present invention, in place of an external power supply, a Zener diode 131 and battery 133 can be connected to the phone unit 15 as illustrated in phantom. Thus, during the times when the handset is removed from the phone and hence the hook switch 45 closed, current flows through the Zener diode 131 to cause the battery 133 to be charged. Subsequently, when the handset is returned to the telephone and the hook lever switch 45 opened, the battery supplies power to the memory unit 91 to maintain the memory unit which is preferably a dynamic memory unit continuously operable. Such an arrangement would, of course, eliminate the necessity of having an external power supply and associated power input lines.

Figure 6:
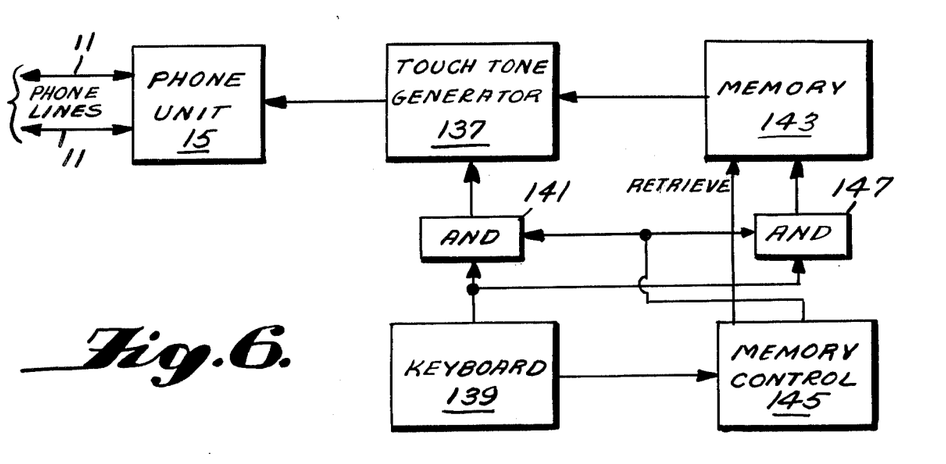
FIG. 6 is a schematic block diagram of the multiple memory system of the present invention in the telephone conversion unit.

It should also be understood that in keeping with the present invention a memory and memory control unit can be utilized in a commercially available touch-tone telephone unit. Thus, with reference to FIG. 6, there is disclosed a telephone unit 15 having a tone generator 137 of conventional design. A keyboard unit 139 is provided which may be the same type as disclosed in conjunction with the embodiments of FIGS. 1 and 4. The output of the keyboard is normally coupled to the touch tone generator 137 via an AND gate 141. However, when the output of the keyboard is to be stored in the memory unit 143, the numbers key (No.) is depressed, thereby coupling a signal to memory control unit 145. The memory control unit 145 provides an output signal which inhibits AND gate 141 and enables AND gate 147. Thus, the output for the keyboard unit 139 is coupled via AND gate 147 to the memory 143. Subsequently, when a number is to be retrieved from memory the numbers key (No.) on the keyboard unit 139 is momentarily depressed thereby coupling a signal to the memory control 145 which causes the stored telephone number in memory unit 143 to be coupled to the tone generator 137. The output of tone generator 137 is then outputted to the telephone lines 11 via the telephone unit 15.

Figure 7:
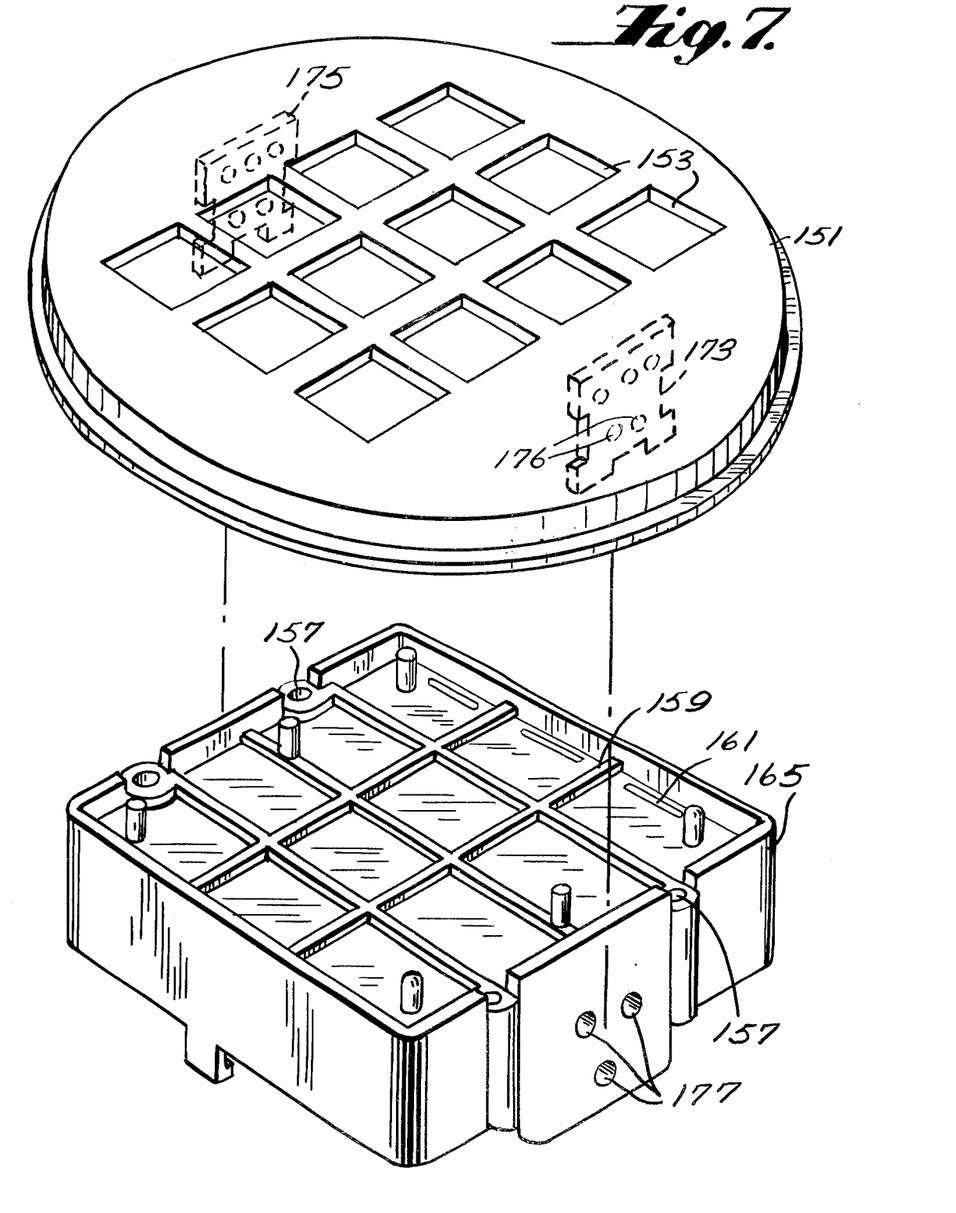
FIG. 7 is an exploded view of housing for the telephone conversion unit of the present invention.

Refer now to FIG. 7 which is an exploded perspective view of the telephone conversion and memory system of the present invention. The keyboard unit is positioned in a cover plate housing 151 which has 12 rectangular receptacles for receiving the 12 keys of the keyboard switch. The housing support 155 fits into a standard rotary dial telephone unit and is secured thereto by means of screws inserted through holes 157. The keyboard switches are positioned on a grid 159 between the housing support 155 and the keyboard housing 151. Positioned beneath a floor 161 are the circuit boards upon which the control circuitry such as the memory, dialer, memory control, etc., are mounted. The cover plate housing 151 has a pair of depending attachment plates 173 and 175 which are positioned over the holes 177 in the housing support 155 so that the cover 151 can be fixably secured to the housing support 155 by appropriately inserting bolt and nuts through holes 176 in the attachment members and in holes 177 in the support 155. Because the structure 155 is designed to fit into a standard telephone unit, the conversion and memory system of the present invention permits a substantial reduction in size over prior art telephone memory devices such as disclosed in U.S. Pat. Nos. 3,360,612 and 3,074,059.

While the present invention has been disclosed in connection with a preferred embodiment thereof, it should be understood that there may be other modifications of the invention which fall within the spirit and scope of the invention as defined by the dependent claims.

What is claimed is:
1. In a conventional telephone unit, a converter positioned therein in place of a rotary dialer unit for converting a keyboard coded telephone number to a serial pulse train corresponding to the type generated by said rotary dialer unit, said converter comprising:
   a. a keyboard switching means having at least ten keys for generating signals corresponding to each of said keys as said keys are depressed,
   b. an electrical encoder means for converting said signals into parallel four bit signals, each encoder signal uniquely identifying a depressed one of said ten keys,
   c. a dialer circuit means for converting said encoded signals to a serial pulse train corresponding to the respective keys depressed,
   d. a bridge rectifier for rectifying the telephone line current conducted to said telephone unit,
   e. means for generating a supply voltage for said converter, said voltage generating means including means for converting telephone line current coupled to said telephone unit to a voltage only when the hook switch of said telephone unit is closed, and voltage multiplying means for increasing said voltage to a preselected voltage level,
   f. a first switch for inhibiting current flow through said telephone unit when said dialer generates said pulse train,
   g. second switching means connected across said telephone unit for interrupting current flow in said telephone lines in accordance with said pulse train, and
   h. a support structure adapted for positioning in a standard telephone unit in place of a rotary dialer, said support structure supporting said converter in said telephone unit housing.

2. The telephone converter of claim 1 wherein said encoder generates a strobe pulse each time a key is depressed, and further comprising a tone generator for generating a tone signal and gating means connected to the output of said tone generator at the input thereof and to the input of a speaker in said telephone at the output thereof, said strobe pulse enabling said gating means when a key is depressed to thereby conduct said tone signal to said speaker to confirm a switching action upon the depression of one of said keys.

3. The telephone converter of claim 2 further comprising a memory means for storing at least ten telephone numbers therein, and a memory control means responsive to the depressing of a storage control key for enabling said memory to store a keyed telephone number or to read out a stored telephone number into said dialer unit.

4. The converter of claim 3 further comprising battery means for storing a portion of the telephone line current coupled to said telephone unit when said hook switch of said telephone unit is closed, said means including a zener diode connected in series with said telephone lines and in parallel with said battery, said zener diode causing a portion of said line current to be stored in said battery when the charge level of said battery goes below a predetermined level, said battery providing a power supply voltage to said converter.

5. The converter of claim 4 wherein said memory control means generates a first storage command signal for enabling said memory to store a keyed telephone number when said storage control key is continuously depressed and for inhibiting the operation of said dialer circuit means, said memory control means retrieving a stored telephone number when said storage control key is momentarily depressed.

6. In a conventional telephone unit having a hand set receiver removably positioned with respect thereto, a hook switch closable when said hand set receiver is removed from the telephone unit, and current conducting telephone lines for conducting bipolar information with respect to said telephone unit, a converter positioned therein in place of a rotary dialer unit for converting a keyboard coded telephone number to a serial pulse train corresponding to the type generated by said rotary dialer unit, said converter comprising:
- a keyboard switching means having at least ten keys for generating signals corresponding to each of said keys as said keys are depressed,
- an electrical encoder means for converting said signals into parallel four bit signals, each encoder signal uniquely identifying a depressed one of said ten keys,
- a dialer circuit means for converting said encoded signals to a serial pulse train corresponding to the respective keys depressed,
- a bridge rectifier for rectifying the telephone line current conducted to said phone unit,
- means for generating a supply voltage for said converter, said voltage generating means including means for converting telephone line current coupled to said telephone unit to a voltage only when the hook switch of said telephone unit is closed, and voltage adjusting means for increasing said voltage to a preselected voltage level,
- a first switch for inhibiting current flow through said telephone unit when said dialer generates said pulse train,
- second switching means connected across said telephone unit for interrupting current flow in said telephone lines in accordance with said pulse train, and
- a support structure adapted for positioning in a standard telephone unit in place of a rotary dialer, said support structure supporting said converter in said telephone unit housing.

* * * * *